United States Patent
Stinson et al.

(10) Patent No.: US 10,606,096 B2
(45) Date of Patent: *Mar. 31, 2020

(54) REDUCING AN OPTICAL POWER OF A REFLECTED LIGHT BEAM

(71) Applicant: ASML Netherlands B.V., Veldhoven (NL)

(72) Inventors: Cory Alan Stinson, San Diego, CA (US); Philip M. Conklin, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,976

(22) Filed: Feb. 22, 2018

(65) Prior Publication Data
US 2018/0246338 A1    Aug. 30, 2018

Related U.S. Application Data

(63) Continuation of application No. 15/402,134, filed on Jan. 9, 2017, now Pat. No. 9,904,068.

(51) Int. Cl.
*G02B 27/42* (2006.01)
*H01S 3/10* (2006.01)
(Continued)

(52) U.S. Cl.
CPC ..... *G02B 27/4261* (2013.01); *G02B 27/0944* (2013.01); *H01S 3/005* (2013.01);
(Continued)

(58) Field of Classification Search
CPC .... G02B 27/00; G02B 27/42; G02B 27/4205; G02B 27/4233
(Continued)

(56) References Cited

U.S. PATENT DOCUMENTS

| 7,491,954 B2 | 2/2009 | Bykanov et al. |
| 8,017,924 B2 | 9/2011 | Bykanov et al. |

(Continued)

FOREIGN PATENT DOCUMENTS

| WO | 2016131601 A1 | 8/2016 |
| WO | 2017101982 A1 | 6/2017 |

OTHER PUBLICATIONS

Nelson V. Tabiryan et al., "Thin waveplate lenses of switchable focal length—new generation in optics", vol. 23, No. 20, doi:10.1364/OE.23.025783, Optics Express 25783, 12 total pages. (Year: 2015).*

(Continued)

*Primary Examiner* — Jason L McCormack
(74) *Attorney, Agent, or Firm* — DiBerardino McGovern IP Group LLC

(57) ABSTRACT

A system for an extreme ultraviolet (EUV) light source includes a light-generation system configured to emit one or more light beams onto a beam path; one or more optical amplifiers, each of the one or more amplifiers including a gain medium on the beam path, each gain medium being configured to amplify the one or more light beams to produce one or more amplified light beams; and one or more diffractive optical elements on the beam path, where each of the one or more diffractive optical elements has a plurality of focal lengths, and each focal length of the diffractive optical element is associated with a particular polarization state.

13 Claims, 14 Drawing Sheets

(51) Int. Cl.
*H01S 3/00* (2006.01)
*G02B 27/09* (2006.01)
*H05G 2/00* (2006.01)
*G02F 1/09* (2006.01)

(52) U.S. Cl.
CPC ......... *H01S 3/10023* (2013.01); *H05G 2/003* (2013.01); *H05G 2/008* (2013.01); *G02F 1/093* (2013.01)

(58) Field of Classification Search
USPC ...................................................... 250/504 R
See application file for complete search history.

(56) References Cited

U.S. PATENT DOCUMENTS

| | | | | |
|---|---|---|---|---|
| 8,680,495 | B1 | 3/2014 | Tao et al. | |
| 8,848,277 | B2 | 9/2014 | Sandstrom et al. | |
| 9,904,068 | B1* | 2/2018 | Stinson | G02B 27/4261 |
| 2006/0250933 | A1* | 11/2006 | Asada | G02B 5/1809 |
| | | | | 369/112.01 |
| 2007/0159701 | A1 | 7/2007 | Campbell et al. | |
| 2008/0087847 | A1* | 4/2008 | Bykanov | H05G 2/003 |
| | | | | 250/504 R |
| 2012/0012762 | A1* | 1/2012 | Nowak | B82Y 20/00 |
| | | | | 250/504 R |
| 2017/0097507 | A1* | 4/2017 | Yeoh | G02B 6/0026 |
| 2017/0099721 | A1 | 4/2017 | Tao et al. | |

OTHER PUBLICATIONS

Erez Hasman et al., "Polarization dependent focusing lens by use of quantized Pancharatnam-Berry phase diffractive optics," Optical Engineering Laboratory, Faculty of Mechanical Engineering, Technion-Israel Institute of Technology, Haifa, Israel, Applied Physics Letters, vol. 82, No. 3, Jan. 20, 2003, 3 total pages.

G.J. Swanson, "Binary Optics Technology: The Theory and Design of Multi-level Diffractive Optical Elements," Technical Report 854, AD-A213 404, Lincoln Laboratory, Massachusetts Institute of Technology, Lexington, Massachusetts, Aug. 14, 1989, 53 total pages.

"Optical Power," Encyclopedia of Laser Physics and Technology, https://www.rp-photonics.com/optical_power.html, 2 total pages, downloaded on Nov. 30, 2016.

Gabriel Biener et al., "Space-Variant Polarization Manipulation for Polarimetric Measurement by use of Subwavelength Gratings," Optical Engineering Laboratory, Faculty of Mechanical Engineering, Technion-Israel Institute of Technology, C-1146, © 2005 OSA/CLEO 2005, 3 total pages.

Nelson V. Tabiryan et al., "Thin waveplate lenses of switchable focal length—new generation in optics," 2015, vol. 23, No. 20, doi:10.1364/OE.23.025783, Optics Express 25783, 12 total pages.

"An introduction to the science, technology, and fabrication of Polarization Directed Flat Lenses," Edmund Optics, Inc., 2016, 16 total pages.

* cited by examiner

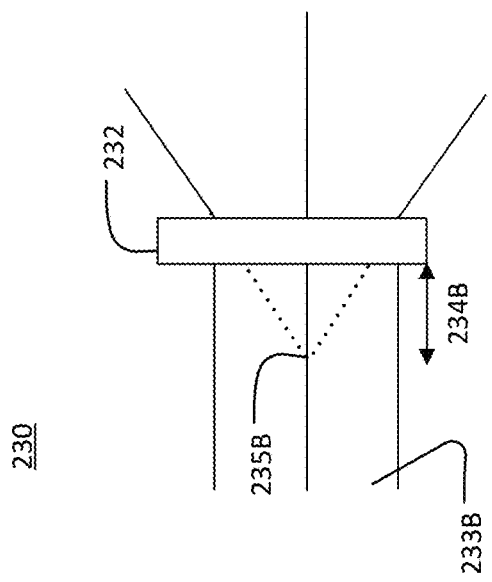
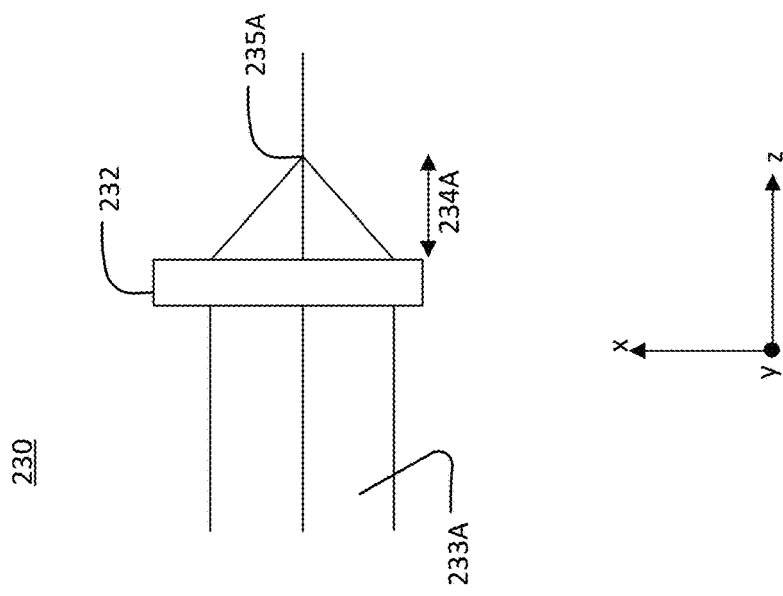
FIG. 2B
FIG. 2A

REDUCING AN OPTICAL POWER OF A REFLECTED LIGHT BEAM

CROSS-REFERENCE TO RELATED APPLICATION

This application is a continuation of U.S. patent application Ser. No. 15/402,134, filed Jan. 9, 2017, now allowed, and titled REDUCING AN OPTICAL POWER OF A REFLECTED LIGHT BEAM, which is incorporated herein by reference in its entirety.

TECHNICAL FIELD

This disclosure relates to reducing an optical power of a reflected light beam in an extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, may be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma may be produced by irradiating a target material, for example, in the form of a droplet, plate, tape, stream, or cluster of material, with an amplified light beam that may be referred to as a drive laser. For this process, the plasma is typically produced in a sealed vessel, for example, a vacuum chamber, and monitored using various types of metrology equipment.

SUMMARY

In one general aspect, a system for an extreme ultraviolet (EUV) light source includes a light-generation system configured to emit one or more light beams onto a beam path; one or more optical amplifiers, each of the one or more amplifiers including a gain medium on the beam path, each gain medium being configured to amplify the one or more light beams to produce one or more amplified light beams; and one or more diffractive optical elements on the beam path, where each of the one or more diffractive optical elements has a plurality of focal lengths, and each focal length of the diffractive optical element is associated with a particular polarization state.

Implementations may include one or more of the following features. The plurality of focal lengths of a diffractive optical element may include at least a first focal length and a second focal length, the first focal length may be associated with a first polarization state, the second focal length may be associated with a second polarization state and the second polarization state may be orthogonal to the first polarization state, and each of the one or more diffractive optical elements may focus light of the first polarization state based on the first focal length and light of the second polarization state based on the second focal length.

The plurality of focal lengths may include at least a first focal length and a second focal length, and the first focal length may be a positive focal length and the second focal length may be a negative focal length such that, after interacting with one of the one or more diffractive optical elements, light of at least one of the polarization states converges, and light of at least one of the polarization states diverges.

The diffractive optical element may include a substrate and a structure, the structure including a plurality of physical features. The structure may be formed in the substrate, and the physical features of the structure may include a plurality of grooves formed in the substrate. The structure may be formed at a surface of the substrate, the physical features of the structure may include a plurality of grooves formed at the surface of the substrate. Each of the one or more light beams emitted by the light-generation system may have a wavelength, and the physical features may be separated from each other by a distance that is smaller than the wavelength of at least one of the one or more light beams.

The physical features of the structure may be arranged as a quasi-periodic structure, and, in some implementations, the physical features of the quasi-periodic structure include at least one pair of grooves that are separated from each other by a distance that is different from the distance between another pair of grooves. The substrate may include a diffractive lens formed from N-phase levels, N being an integer number equal or greater than two, the physical features of the structure may include a plurality of grooves form groups of grooves, with one group of grooves being formed at each of the N-phase levels, and the grooves at one of the N-phase levels may be oriented in a direction that is different than a direction of orientation of the grooves formed at least at one other of the N-phase levels. The substrate may include one or more of diamond, zinc selenide (ZnSe), gallium arsenide (GaAs), and germanium (Ge).

In some implementations, each of the one or more optical amplifiers includes an input window and an output window on the beam path, the gain medium of the optical amplifier being between the input window and the output window, and at least one input window of any of the optical amplifiers or at least one output window of any of the optical amplifiers is one of the one or more diffractive optical elements.

The system for the EUV light source also may include an optical system including one or more optical elements on the beam path, each of the optical elements configured to interact with the one or more amplified light beams to focus the one or more amplified light beams, the optical system further including at least one of the one or more diffractive optical elements.

In another general aspect, a method for reducing an optical power of a reflected light beam in an extreme ultraviolet (EUV) light source includes emitting a light beam onto a beam path, the light beam having a first polarization state and propagating on the beam path in a first direction; modifying a wavefront of the light beam by passing the light beam through a diffractive optical element, the diffractive optical element having a first focal length for light having the first polarization state and a second focal length for light having a second polarization state; and modifying a wavefront of a reflection of the light beam by passing the reflection through the diffractive optical element, the diffractive optical element modifying the wavefront of the light beam and the wavefront of the reflection of the light beam differently.

Implementations may include one or more of the following features. Modifying the wavefront of the light beam by passing the light beam through the diffractive optical element may include converging the light beam toward a first focal point associated with the first focal length, and modifying the wavefront of the reflection of the light beam by passing the reflection through the diffractive optical element may include diverging the reflection of the light beam.

In some implementations, the method also includes passing the light beam through an optical element, the optical element having an open region with an extent that is larger than an extent of the light beam in a plane perpendicular to a direction of propagation of the light beam, where diverging the reflection of the light beam includes diverging the light beam such that, when the diverged reflected light beam reaches the optical element, the extent of the reflected light beam is greater than the extent of the open region of the aperture.

The light beam and the reflection of the light beam may propagate on the beam path in different directions, and the light beam and the reflection of the light beam may have the first polarization state when incident on the diffractive optical element.

The first polarization state and the second polarization states may be circular polarization states that are orthogonal to each other.

In another general aspect, an extreme ultraviolet light source includes an optical drive system, the optical drive system including a light generation system, one or more optical amplifiers, and a diffractive optical element including a substrate and grooves formed in the substrate, the diffractive optical element having a plurality of distinct focal lengths, each of the distinct focal lengths being associated with light of a particular polarization state; and a vacuum chamber including an interior region configured to receive a target material and an amplified light beam from the optical drive system at a target region, where the diffractive optical element is positioned between the light generation module and the target region.

Implementations may include one or more of the following features. The light generation system may include: one or more optical pre-amplifiers, one or more sources of light, and a polarization-based optical isolator, where the diffractive optical element is positioned between the one or more sources of light and the polarization-based optical isolator.

The optical drive system may include more than one optical amplifier, and the diffractive optical element may be between the target location and the optical amplifier that is closest to the target location.

In some implementations, the extreme ultraviolet light source further includes a focus assembly between the optical amplifier that is closest to the target location and the target location, the focus assembly including one or more optical elements configured to focus light toward the target location, where the diffractive optical element is part of the focus assembly.

Implementations of any of the techniques described above may include an EUV light source, a system, a method, a process, a device, or an apparatus. The details of one or more implementations are set forth in the accompanying drawings and the description below. Other features will be apparent from the description and drawings, and from the claims.

DRAWING DESCRIPTION

FIGS. 2A-2D are side block diagrams of an exemplary diffractive optical element.

DETAILED DESCRIPTION

Figure 1:
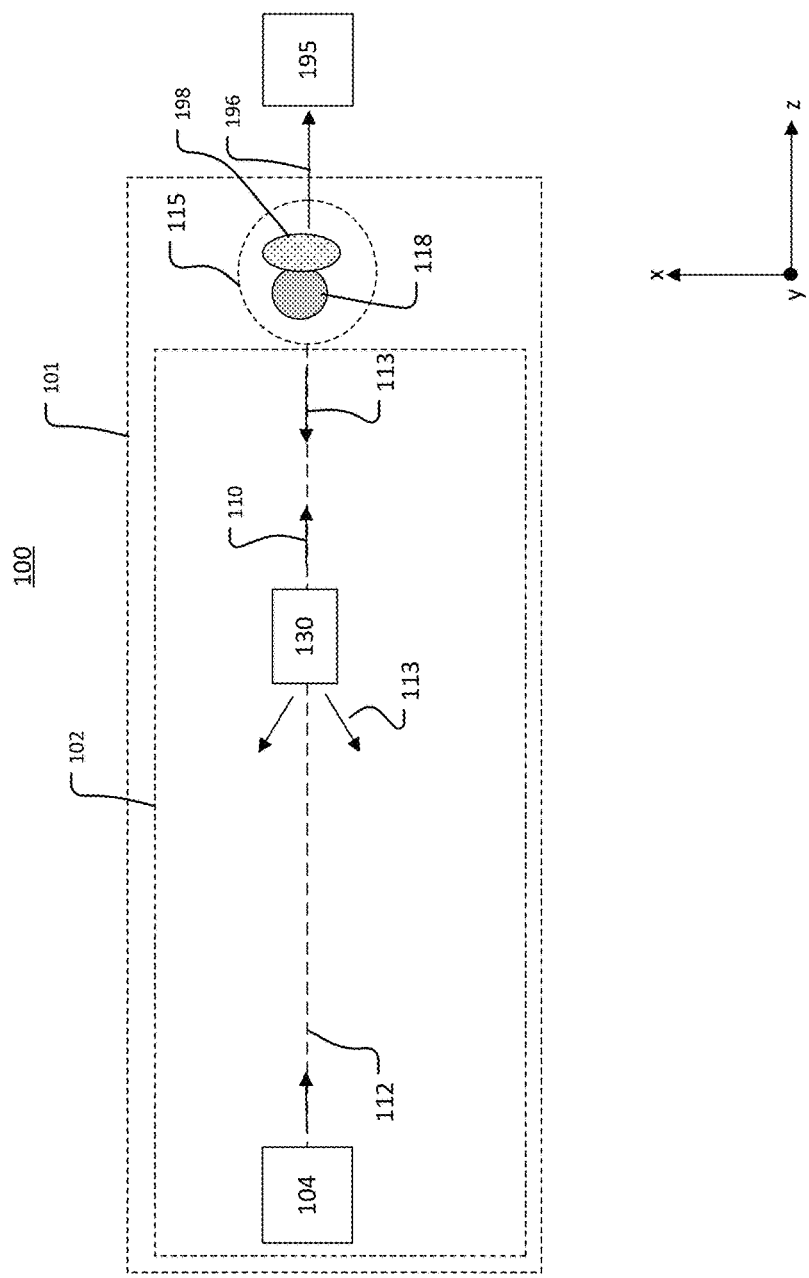
FIG. 1 is a block diagram of an exemplary EUV photolithography system.

Referring to FIG. 1, a block diagram of an exemplary optical lithography system 100 is shown. The optical system 100 includes an extreme ultraviolet (EUV) light source 101 that generates EUV light 196 for use in a photolithography tool 195. The light source 101 includes an optical drive system 102, which includes a light-generation system 104 and a polarization-dependent optical isolation system 130. The light-generation system 104 is a source of light (for example, one or more lasers, lamps, or any combination of such elements). The optical drive system 102 emits a light beam 110 that propagates along a path 112 toward a target region 115. The target region 115 receives a target 118, which includes a target material that emits EUV light when in a plasma state, and the light beam 110. An interaction between the target material and the light beam 110 produces a plasma 198 that emits the EUV light 196.

In addition to the light beam 110, a reflection 113 may propagate on the path 112. The reflection 113 propagates in a different direction than the light beam 110. For example, the light beam 110 and the reflection 113 may propagate on the path 112 in opposite directions. The reflection 113 may arise from an interaction of the light beam 110 with the target material and/or the plasma 198 that emits the EUV light 196. All or a portion of the reflection 113 may arise from interactions between the light beam 110 and objects other than the target 118 on the path 112, such as an optical element (for example, a lens) or device (for example, a spatial filter). Regardless of the source of the reflection 113, it is desirable to reduce the optical power (the energy per unit time) of the reflection 113 because doing so may lead to greater stability of the light source 101 by preventing or reducing self-lasing and also may increase the amount of EUV light that the light source 101 is capable of producing. The polarization-dependent optical isolation system 130 reduces the optical power of the reflection 113.

The polarization-dependent optical isolation system 130 includes a diffractive optical element that changes the propagation of light based on the polarization state of the light and the direction of propagation of light. For example, the diffractive optical element may change the propagation of the light by focusing the light in a manner that depends on the polarization state of the light. Polarization is a parameter that describes the direction of oscillation of the electric field of a light beam. A type of polarization and a direction of polarization define a polarization state. The type of polarization may be linear, circular, elliptical, or random, or the light beam may be unpolarized. A light beam that is linearly polarized has an electric field that oscillates in a single plane that is constant over time, with the polarization state indicating the plane of oscillation. For linearly polarized light, a polarization state in which the electric field oscillates in a first plane is orthogonal to a polarization state in which the electric field oscillates in a second plane that is orthogonal (for example, perpendicular) to the first plane. Linear polarized light that has an electric field polarized parallel to a plane of incidence may be referred to as P-polarized light, and S-polarized light is linearly polarized light that has an electric field perpendicular to the plane of incidence. Circularly polarized light has an electric field that describes a helix along the direction of propagation. Circularly polarized light may have different, orthogonal states. For example, circularly polarized light may be right-handed polarized light, in which the electric field rotates clockwise (as viewed from a point that receives the light), or left-hand polarized light, in which the electric field rotates counter-clockwise (as viewed from a point that receives the light).

The polarization-dependent optical isolation system 130 includes an optical element that has more than one focal length, with each focal length being associated with a different polarization state. For example, the polarization-dependent optical isolation system 130 may be positioned within the optical drive system 102 such that the diffractive optical element converges the light beam 110 and diverges the reflection 113. By diverging the reflection 113, the polarization-dependent optical isolation system 130 increases the area over which the reflection 113 is spread. Thus, even if a portion of the reflection 113 remains on the path 112, the polarization-dependent optical isolation system 130 reduces the amount of optical power of the reflection 113 on the path 112.

Figure 5A:
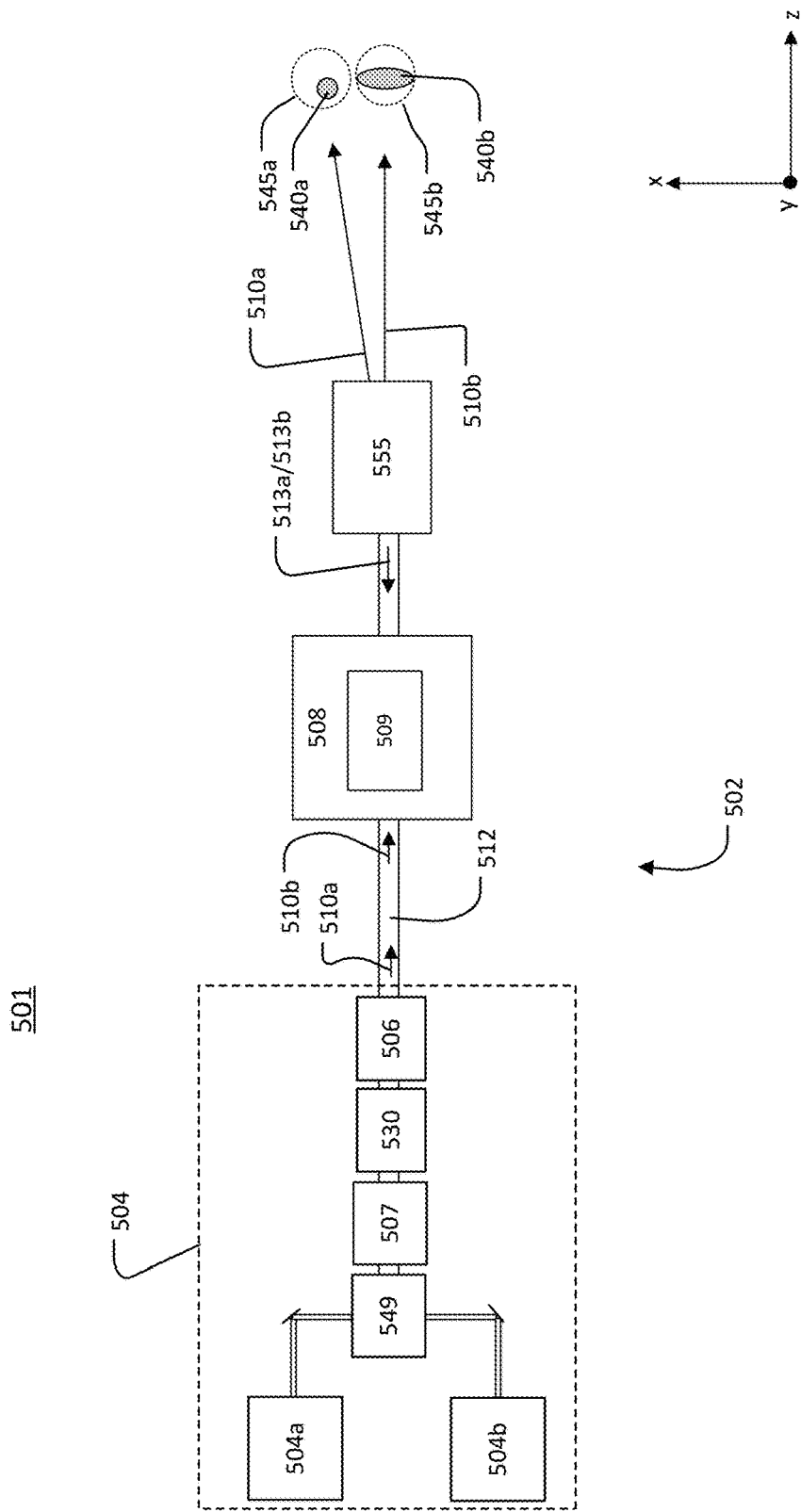
FIGS. 5A and 6 are block diagrams of exemplary EUV light sources.
Figure 5B:
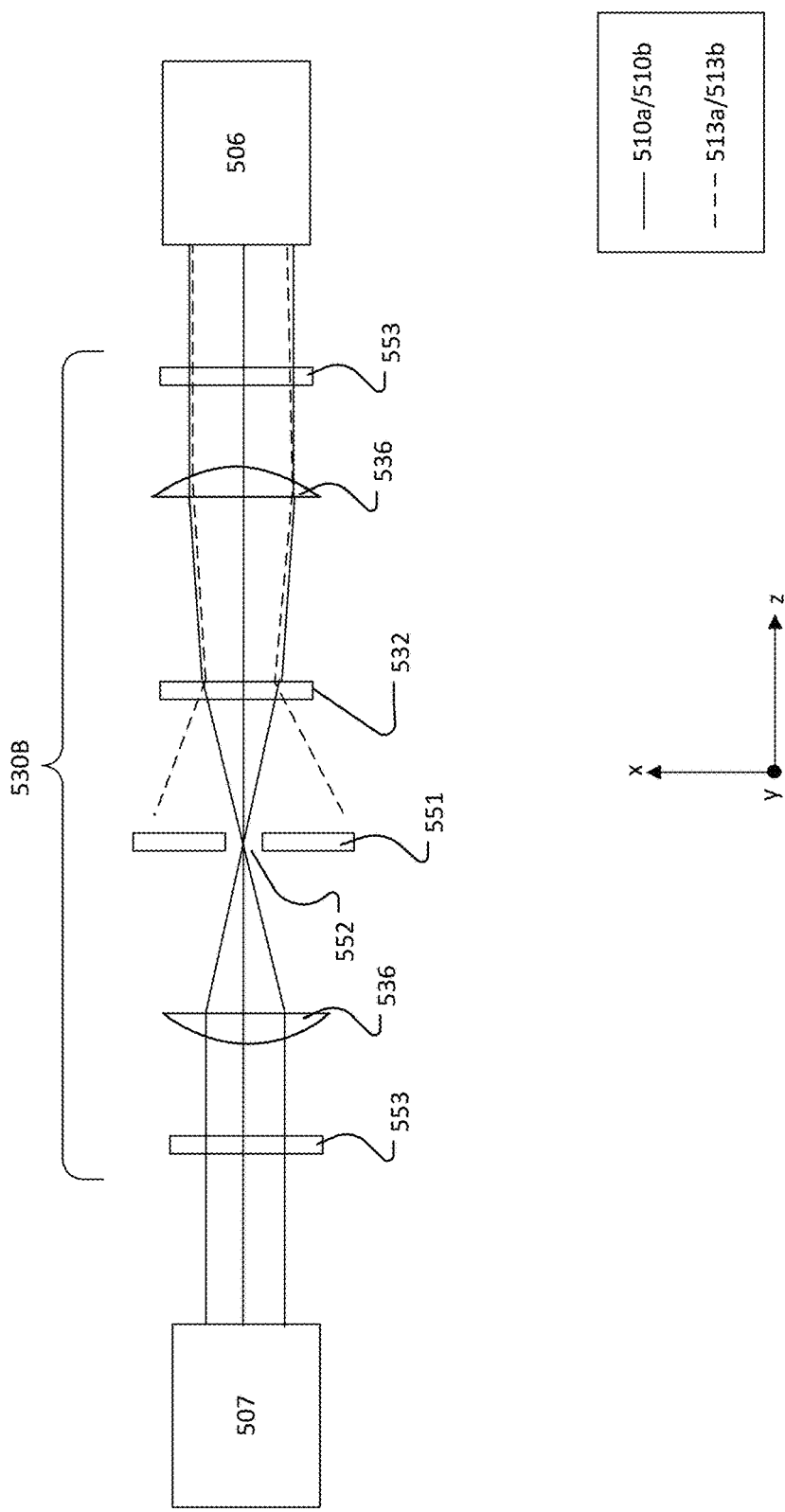
FIG. 5B is a block diagram of an exemplary polarization-dependent optical isolation system that may be used in the EUV light source of FIG. 5A.

The polarization-dependent optical isolation system 130 may be used alone or with other optical isolation mechanisms (for example, as discussed with respect to FIGS. 5A and 5B). Other optical isolation mechanisms include, for example, thin-film polarizers (TFP) and/or Brewster plates that block or transmit the reflection 113 based on polarization, and active optical isolation mechanisms, such as acousto-optic modulators (AOMs), that deflect the reflection 113 and the light beam 110 in different directions. However, these other optical isolation mechanisms do not change the propagation of the reflection 113 by converging or diverging the reflection 113 like the polarization-dependent optical isolation system 130. Moreover, other optical isolation mechanisms based on polarization (for example, TFP and/or Brewster plates) are typically intended to receive linearly polarized light, whereas the polarization-dependent optical isolation system 130 may receive and act on circularly polarized light directly without first converting the circularly polarized light to linearly polarized light, and this may allow the polarization-dependent optical isolation system 130 to be used in locations within the optical drive system 102 where other isolators are unable to be used. Further, in various implementations, the polarization-dependent optical isolation system 130 may include only passive components and may lack the driving electronics and control circuitry typically used with an AOM. Thus, the polarization-dependent optical isolation system 130 may require fewer components and may be simpler to implement and operate.

In some implementations, the polarization-dependent optical isolation system 130 is used with one or more optical isolation mechanisms that do not change the propagation of incident light based on polarization, such as the other mechanisms noted above. Because the operation of the polarization-dependent optical isolation system 130 is based on a different principle than the other optical isolation mechanisms, the system 130 may complement and improve the performance of the other mechanisms and may further reduce reflections in the optical drive system 102.

Referring to FIGS. 2A and 2B, a block diagram of an exemplary polarization-dependent optical isolation system 230 is shown. The polarization-dependent optical isolation system 230 may be used in the optical drive system 102 (FIG. 1). The polarization-dependent optical isolation system 230 includes a diffractive optical element 232, which interacts with incident light depending on the polarization of the incident light.

In the example of FIG. 2A, the diffractive optical element 232 interacts with light 233A, which has a first polarization state and propagates in the z direction. FIG. 2B shows the diffractive optical element 232 interacting with light 233B, which also propagates in the z direction but has a second polarization state that is different from the first polarization state. The diffractive optical element 232 has a focal length 234A for light of the first polarization state and a focal length 234B for light of the second polarization state. In the example of FIGS. 2A and 2B, the focal length 234A is a positive focal length, meaning that incident light 233A (which has the first polarization state) converges to a focal point 235A after interacting with the diffractive optical element 232. The focal length 234B is a negative focal length, meaning that incident light 233B (which has the second polarization state) diverges after interacting with the diffractive optical element 232.

In the example of FIGS. 2A and 2B, the first and second polarization states are different polarization states, and may be orthogonal polarization states. For example, the light 233A may be right-hand circularly polarized light and the light 233B may be left-hand circularly polarized light (or vice versa). In another example, the light 233A may be a first linearly polarized state, and the light 233B may be a second linearly polarized state that is different from the first linearly polarized state. The diffractive optical element 232 may treat linearly polarized light as a combination of right-hand circularly polarized light and left-hand circularly polarized light, resulting in a convergence and divergence of the light.

Figure 2D:
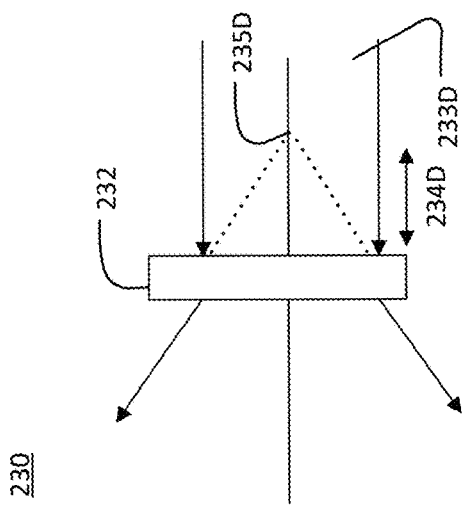
Figure 2C:
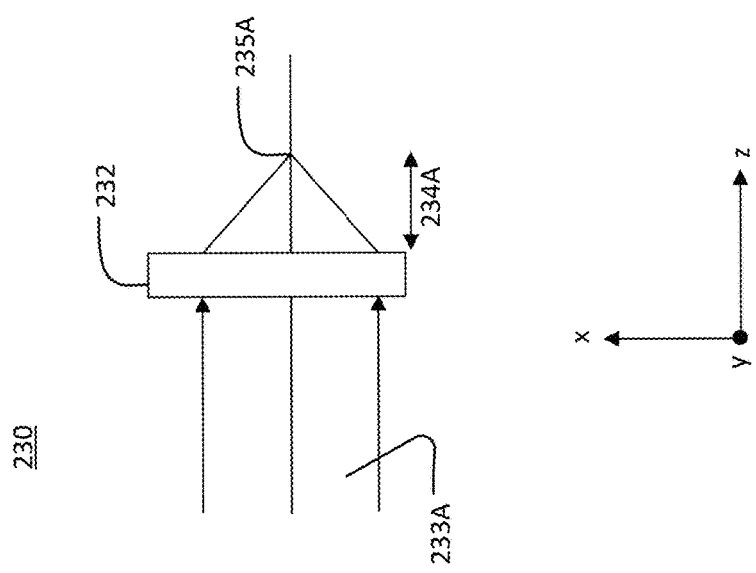

Referring also to FIGS. 2C and 2D, the manner in which the diffractive optical element 232 interacts with incident light also may depend on the direction of propagation of the incident light. FIG. 2C shows the diffractive optical element 232 interacting with the light beam 233A, which is the same light beam as illustrated in FIG. 2A. The diffractive optical element 232 converges the light beam 233A to the focal point 235A. FIG. 2D shows the diffractive optical element 232 interacting with a light beam 233D. The light beam 233D has the same polarization state as the light beam 233A, but the light beam 233D propagates in the opposite direction (the −z direction in this example). For example, the light beams 233A and 233D may both be right-hand polarized light, or the light beams 233A and 233D may be linear polarized light with an electric field that oscillates in the x-z plane.

Although the light beams 233A and 233D have the same polarization state, the diffractive optical element 232 changes the propagation of the light beams 233A and 233D in different ways. In this example, the diffractive optical element 232 has a focal length 234D for light having the polarization state and direction of propagation of the light beam 233D. The focal length 234D is a negative focal length for light that propagates in the −z direction, thus the diffractive optical element 232 diverges the light beam 233D. Thus, the diffractive optical element 232 changes the propagation of light based on the polarization of the light and the direction of propagation. In other words, the focal length of the diffractive optical element 232 may be different for light of a particular polarization state depending on the direction in which the light passes through the diffractive optical element 232.

Figure 3B:
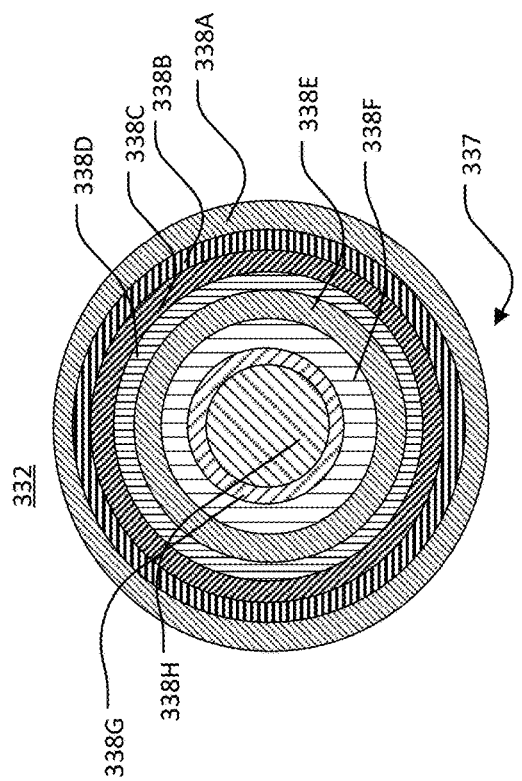
FIG. 3B is a front view of the diffractive optical element of FIG. 3A.
Figure 3B:
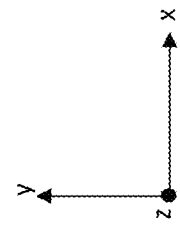
Figure 3A:
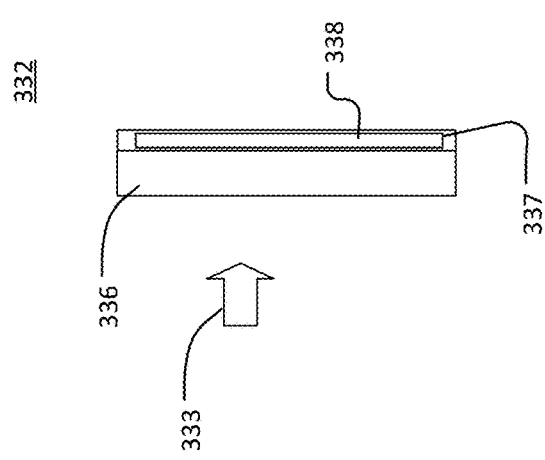
FIG. 3A is a side view of another exemplary diffractive optical element.
Figure 3A:
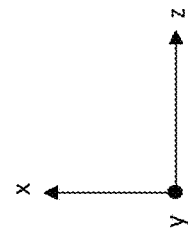

FIGS. 3A and 3B are side and front views, respectively, of an exemplary diffractive optical element 332. The diffractive optical element 332 may be similar to the diffractive optical element 232 (FIGS. 2A-2D), and the diffractive optical element 332 may be used in the polarization-dependent optical isolation systems 130 and 230. The diffractive optical element 332 is a combination of a phase focusing diffractive optical element 336 (also referred to as a focusing element 336) and a structure 337, which includes physical features 338. The arrangement of the physical features 338 of the structure 337 allows the diffractive optical element 332 to be polarization dependent. In the example of FIG. 3A, the structure 337 is at a surface of the element 336, and the physical features 338 are represented by a block in a portion of the structure 337. However, the structure 337 and/or the physical features 338 may be in other locations relative to the element 336. For example, the structure 337 may be formed in the element 336 or at a surface of the element 336 other than the surface shown.

The physical features 338 may be any features capable of diffracting light. For example, the physical features 338 may be grooves that are etched or otherwise formed in the element 336. In some implementations, the physical features 338 may be formed by depositing regions of a material that has different optical properties (such as index of refraction) than the material of the element 336 onto and/or into the element 336. The physical features 338 may be spaced from each other by a distance that is less than the wavelength of an incident light beam 333. The physical features 338 may be formed in regions of the structure 337 other than those depicted in FIG. 3A.

The focusing element 336 modulates the incident light 333, which passes through or otherwise interacts with the element 336, by imparting a phase shift or phase modulation onto the light 333. The amount of phase shift imparted by the element 336 is defined by a phase profile. The phase profile may vary in one or more directions that are different than the direction of propagation of the incident light 333. For example, the phase profile may vary along the x and/or y directions of the focusing element 336. Because the element 336 imparts a phase shift onto the incident light 333, and the amount of the phase shift may vary along a direction that is different than the direction of propagation of the incident light 333, the element 336 may change the shape of the wavefront of the light 333. A wavefront is a surface over which an optical wave has a constant phase. For example, the phase profile of the element 336 may be such that the element 336 acts as a lens. In some implementations, the element 336 is implemented as a Fresnel zone plate.

The element 336 may be made from any material that is transparent to the wavelengths in the light 333. For example, in implementations in which the light 333 has a wavelength of 9-11 microns (μm), the element 336 may be made from diamond, germanium (Ge), zinc selenide (ZnSe), gallium arsenide (GaAs), or a combination of such materials. The phase profile may be implemented by, for example, modulating or varying the index of refraction of the material of the element 336 along a direction that is orthogonal or otherwise different than the direction of propagation of the incident light and/or by varying the thickness of the element 336 along the direction of propagation of the incident light.

The diffractive optical element 332 also includes the structure 337. FIG. 3B shows a front view of the structure 337. In the implementation of FIGS. 3A and 3B, the structure 337 includes eight concentric regions of physical features 338 (labeled as 338A-338H on FIG. 3B). The various physical features 338 are illustrated by different shading patterns in FIG. 3B, though the actual arrangement of the physical features 338 may vary from what is shown.

As discussed above, the focusing element 336 imparts a phase shift, and the structure 337 with the physical features 338 determines how the diffractive optical element 332 interacts with particular polarization states. The combination of the focusing element 336 and the structure 337 allows the diffractive optical element 332 to focus or otherwise change the propagation of incident light based on the polarization state of the incident light. In particular, the arrangement of the physical features 338 of the structure 337 allows the diffractive optical element 332 to focus light based on the polarization state of the light. For example, the physical features 338 of the eight regions may be oriented in different directions, forming a quasi-periodic structure of physical features that act as space-variant waveplates. Through the orientation of the physical features, the diffractive optical element 332 may behave as a polarization-dependent lens that converges or diverges incident light based on the polarization state of the incident light.

Figure 4B:
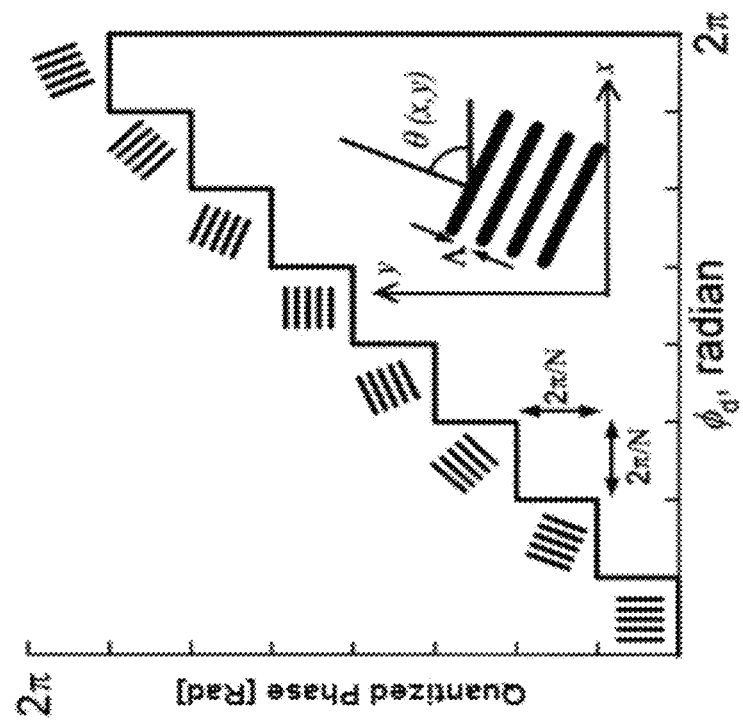
FIGS. 4A and 4B illustrate phase profile information for an exemplary diffractive optical element.
Figure 4A:
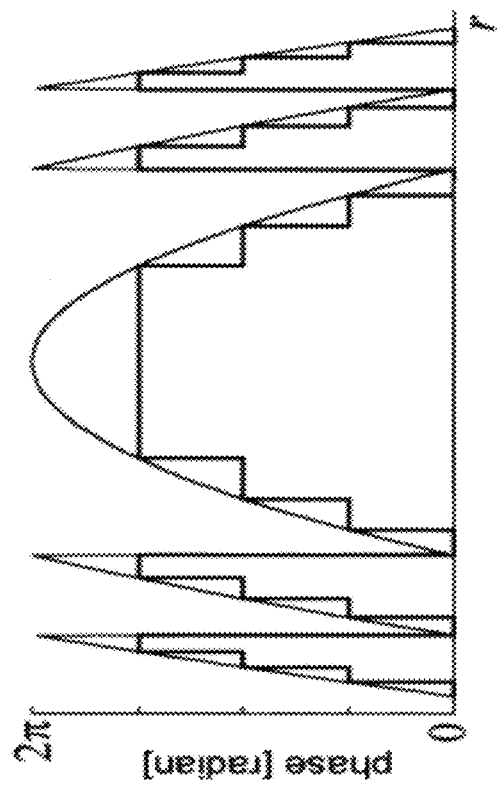

FIGS. 4A and 4B relate to examples of a diffractive optical element that may be used as the diffractive optical element 232 or 332. The diffractive optical element may be a blazed diffraction grating with N discrete phase levels (for example, N-level binary phase ramps that approximate the phase profile of the blazed diffraction grating, where N is an integer number that is a power of two, such as 2, 4, 8, 16, or 128). FIG. 4A is a plot of a predicted quantized geometrical phase profile as a function of location on a diffractive optical element with four discrete phase levels (N=4). In FIG. 4A, the center point of 0 to r is associated with the geometric center of the optical element. FIG. 4B is a plot of quantized phase as a function of desired phase and the local orientation of the physical features for a diffractive optical element that includes eight discrete phase levels. FIGS. 3B, 4A, and 4B are based on information from Erez Hasman et al, "Polarization dependent focusing lens by use of quantized Pancharatnam-Berry phase diffractive optics," Applied Physics Letters, Vol. 82, No. 3, Jan. 20, 2003, pp. 328-330.

Figure 4C:
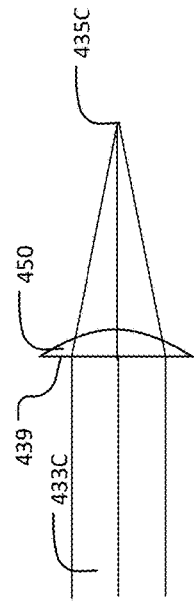
FIGS. 4C and 4D are side block diagrams of a typical refractive lens.
Figure 4D:
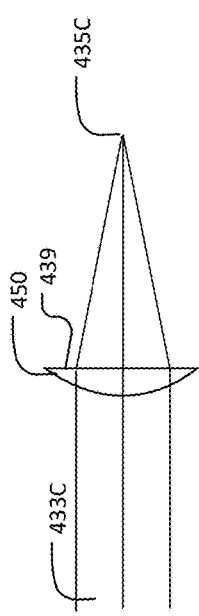

FIGS. 4C-4H illustrate interactions between light and various optical elements. FIGS. 4C-4H have the same coordinate system as FIG. 3A. FIGS. 4C and 4D show a typical lens 450 that converges incident light 433C to a focal point 435C using refraction. In the example shown in FIGS. 4C and 4D, the lens 450 is a plano-convex lens that causes light that passes through it to converge to the focal point 435C using refraction. The incident light 433C propagates in the z direction and has a polarization state. For example, the incident light 433C may be right-hand circularly polarized. The lens 450 has a different orientation in FIG. 4D as compared to FIG. 4C. In particular, in FIG. 4C, a planar portion 439 of the lens 450 faces away from the incident light 433C, and in FIG. 4D, the planar portion 439 faces toward the incident light 433C. However, the orientation of the lens 450 does not change the converging action that the lens 450 imparts onto the incident light 433C. Moreover, the polarization state of the incident light 433C does not change as a result of passing through the lens 450, regardless of the orientation of the lens 450.

Figure 4E:
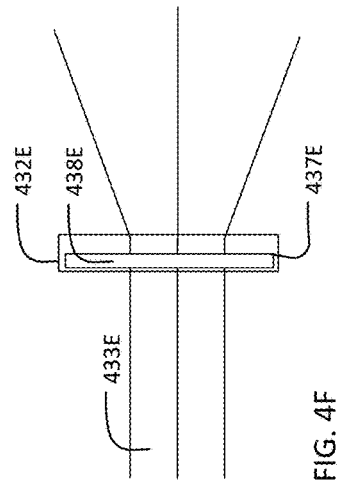
FIGS. 4E-4H are side block diagrams of another exemplary diffractive optical element.
Figure 4F:
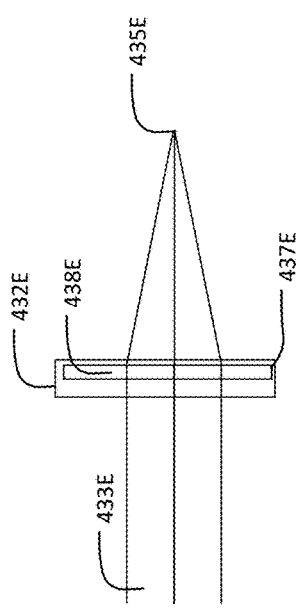

FIGS. 4E-4H illustrate a diffractive optical element 432E, which is another example implementation of the diffractive optical element 232 (FIGS. 2A-2D) or the diffractive optical element 332 (FIG. 3A). The diffractive optical element 432E includes a structure 437E with physical features 438E. In the example of FIG. 4E, the diffractive optical element 432E is oriented with the structure 437E facing away from an incident light beam 433E. In FIG. 4F, the diffractive optical element 432E is oriented with the structure 437E facing the incident light beam 433E. The incident light beam 433E propagates in the z direction and has a polarization state. In the example of FIGS. 4E and 4F, the light beam 433E is right-hand circularly polarized when incident on the diffractive optical element 432E. In the orientation shown in the example of FIG. 4E, the diffractive optical element 432E converges the light beam 433E to a focal point 235E. In the orientation shown in the example of FIG. 4F, the diffractive optical element 432E diverges the light beam 433E. Additionally, the polarization state of the light beam 433E changes to left-hand circularly polarized as a result of passing through the diffractive optical element 432E.

Figure 4G:
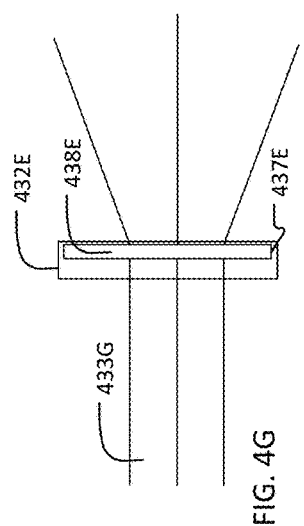
Figure 4H:
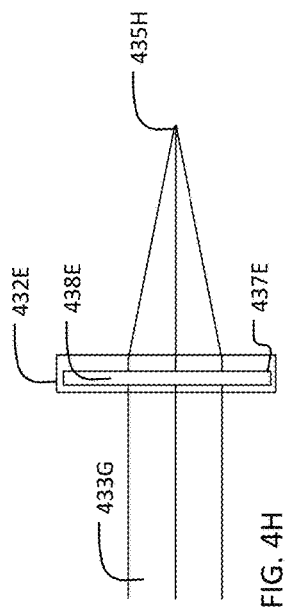

In the example of FIG. 4G, the diffractive optical element 432E is oriented with the structure 437E facing away from an incident light beam 433G. In FIG. 4H, the diffractive optical element 432E is oriented with the structure 437E facing the incident light beam 433G. The light beam 433G propagates in the z direction and is left-hand circularly polarized. In the orientation shown in FIG. 4G, the diffractive optical element 432E diverges the light 433G. In the orientation shown in FIG. 4H, the diffractive optical element 432E converges the light 433G to a focal point 235H. Additionally, the polarization state of the light beam 433G changes to right-hand circularly polarized after passing through the diffractive optical element 232E.

Thus, unlike the typical lens 450, the orientation of the diffractive optical element 432E relative to the direction of propagation of an incident light beam may determine the phase profile imparted onto the light beam. Additionally, the diffractive optical element 432E may change the polarization state of incident light.

Referring to FIG. 5A, an exemplary EUV light source 501 is shown. The EUV light source 501 may be used as the optical source 101 in the optical system 100 (FIG. 1). The EUV light source 501 includes an optical drive system 502, which directs first and second light beams 510a, 510b along a beam path 512 to respective target regions 545a, 545b. The target region 545a receives an initial target 540a, and an interaction between the first light beam 510a and the initial target 540a conditions the initial target 540a to form a conditioned target 540b. For example, an interaction between the first light beam 510a and the initial target 540a may change the geometric distribution of target material in the initial target 540a and/or optical properties of the initial target 540a to form the conditioned target 540b. The conditioned target 540b travels to the target region 545b, and an interaction between the second light beam 510b and the conditioned target 540b converts at least some of the conditioned target 540b into a plasma that emits EUV light. In this example, the first light beam 510a may be referred to as a "pre-pulse," and the second light beam 510b may be referred to as the "main pulse."

In addition to the first light beam 510a and the second light beam 510b, a reflection 513a and/or a reflection 513b may propagate on the beam path 512. The reflection 513a may arise from by the light beam 510a reflecting off of the initial target 540a or an element on the path 512 (such as an optical element or spatial filter in the beam steering and focusing system 555). The reflections 513a, 513b propagate on the path 512 in a direction that is different from the direction in which the first and second light beams 510a, 510b propagate.

The optical drive system 502 includes a light-generation system 504, which produces the first and second light beams 510a, 510b, an optical amplifier 508, which includes a gain medium 509, and a beam transport and focusing system 555, which directs the light beams 510a, 510b to their respective target regions 545a, 545b. The light-generation system 504 also may include one or more pre-amplifiers arranged in series along the path 512. In the example of FIG. 5A, a pre-amplifier 507 represents the one or more pre-amplifiers of the light-generation system 504. Although one pre-amplifier 507 is shown, more than one pre-amplifier may be used in the light-generation system 504. The pre-amplifier 507 receives and amplifies the first and second light beams 510a, 510b within the light-generation system 504.

The optical drive system 502 also includes a polarization-dependent optical isolation system 530, which may be similar to the polarization-dependent optical isolation systems 130, 230 discussed above. In the example of FIG. 5A, the polarization-dependent optical isolation system 530 is in the light-generation system 504 and is positioned between light-emitting modules 504a and 504b and a polarization-based optical isolator 506. The polarization-dependent optical isolation system 530 may be physically separate from the pre-amplifier 507, the light-emitting modules 504a and 504b, and the polarization-based optical isolator 506, or the polarization-dependent optical isolation system 530 may be integrated into one or more of these devices. For example, the polarization-dependent optical isolation system 530 may be used as a transmission window on the pre-amplifier 507. The polarization-dependent optical isolation system 530 reduces the impact of the reflections 513a and/or 513b on the light-generation system 504. In particular, the polarization-dependent optical isolation system 530 reduces the amount of optical power in the reflections 513a and/or 513b prior to the reflections 513a and/or 513b reaching the pre-amplifier 507.

Depending on the location within the optical drive system 502 and the configuration of the optical drive system 502, the light beam 510a and the reflection 513a may have the same or different polarization states. Similarly, the light beam 510b and the reflection 513b may have the same or different polarization states. In the example of FIG. 5A, the light beam 510a and the reflection 513a have the same polarization state at the polarization-dependent optical isolation system 530. For example, the light beam 510a and the reflection 513a may both be right-hand circular polarized light when incident on the polarization-dependent optical isolator 530.

The light-generation system 504 includes two light-emitting modules 504a, 504b. In the example of FIG. 5A, the light-emitting modules 504a, 504b produce the first and second light beams 510a, 510b, respectively. The light-emitting modules 504a, 504b may be, for example, two lasers. For example, each of the light-emitting modules 504a, 504b may be a carbon dioxide ($CO_2$) laser. The first and second light beams 510a, 510b have different wavelengths within the gain band of the gain medium 509. For example, in implementations in which the light-emitting modules 504a, 504b include two $CO_2$ lasers, the light beams 510a, 510b may be generated from different lines of the $CO_2$ laser, resulting in the light beams 510a, 510b having different wavelengths even though both beams are generated from the same type of laser source. In some implementations, the light beams 510a, 510b have wavelengths between 9 and 11 microns (μm). For example, the wavelength of the first light beam 510a may be about 10.26 μm. The wavelength of the second light beam 510b may be between about 10.18 μm and 10.26 μm, or the wavelength of the second light beam 510b may be about 10.59 μm.

The light-generation system 504 also includes a beam combiner 549 that directs the first and second light beams 510a, 510b onto the beam path 512. The beam combiner 549 may be any optical element or a collection of optical elements capable of interacting with the first beam 510a and/or the second beam 510b to direct the first and second light beams 510a, 510b onto the beam path 512. For example, the beam combiner 549 may be a collection of mirrors, some of which are positioned to direct the first light beam 510a onto the beam path 512 and others of which are positioned to direct the second light beam 510b onto the beam path 512. The first and second light beams 510a, 510b may propagate on the path 512 at different times, but both light beams 510a, 510b traverse substantially the same spatial region through the optical drive system 502 and both pass through the gain medium 509 of the optical amplifier 508.

The light-generation system 504 also includes a polarization-based optical isolator 506. The polarization-dependent optical isolation system 530 is positioned between the polarization-based optical isolator 506 and the pre-amplifier 507. The polarization-based optical isolator 506 blocks or transmits incident light based on the polarization of the incident light, and the optical isolator 506 is configured to transmit the light beams 510a, 510b and to block the reflections 513a, 513b. However, the polarization-based optical isolator 506 does not change the propagation of the incident light by, for example, converging or diverging the incident light. Thus, the polarization-based optical isolator 506 operates on a different principle than the polarization-dependent optical isolation system 530. The polarization-based optical isolator 506 may be, for example, a thin-film polarizer (TFP) or a Brewster plate.

Because the polarization-based optical isolator 506 and the polarization-dependent optical isolation system 530 rely on different mechanisms, using both isolators (such as the in the example of FIG. 5A) may lead to greater rejection of the reflections 513a, 513b. For example, although the polarization-based optical isolator 506 may remove a portion of the reflections 513a, 513b from the path 512, some light from the reflections 513a, 513b may remain on the path 512 even after interacting with the polarization-based optical isolator 506. The polarization-dependent optical isolation system 530 may cause the remaining reflected light to diverge, which further reduces the amount of reflected light that reaches the pre-amplifier 507.

For example and referring to FIG. 5B, which is a block diagram of an exemplary implementation of the polarization-dependent optical system 530B positioned in the light source 501 between the pre-amplifier 507 and the polarization-based optical isolator 506, the polarization-dependent optical isolation system 530B may reject or mitigate the beams 513a, 513b while maintaining the proper propagation of the beams 510a, 510b. After exiting the pre-amplifier 507, the light beams 510a, 510b may have a linear polarization state. For example, the polarization state may be a 45 degree linearly polarization state with the electric field oscillating at 45 degrees relative to the y-z plane. The polarization-dependent optical isolation system 530B includes phase retarders 553, lenses 536, a spatial filter 551, which defines an aperture 552, and a diffractive optical element 532, which may be similar to any of the diffractive optical elements 232, 333, and 432E discussed above. The phase retarder 533 may be any optical element that is capable of changing linearly polarized light to circularly polarized light and vice versa. For example, the phase retarders 553 may be reflective phase retarders (RPR) or quarter-wave plates. FIG. 5B shows the path of the beams 510a, 510b (solid line) and the beams 513a, 513b (dashed line).

The beams 510a, 510b exit the pre-amplifier 507 as linearly polarized light and are incident on a phase retarder 553, which changes the polarization state of the beams 510a, 510b such that the beams 510a, 510b are circularly polarized. In this example, the beams 510a, 510b are right-hand circularly polarized after passing through the phase retarder 553. The beams 510a, 510b then pass through the lens 536, which converges the beams 510a, 510b such that the beams 510a, 510b are able to pass through the aperture 552 of the spatial filter 551. The beams 510a, 510b diverge after passing through the aperture 552 and are converged by the diffractive optical element 532. The diffractive optical element 532 also changes the polarization state of the beams 510a, 510b to left-hand circularly polarized. The beams 510a, 510b pass through another instance of the lens 536 and are collimated, and then pass through another instance of the phase retarder 553, which changes the polarization state of the beams 510a, 510b to linear polarization. The beams 510a, 510b pass through the polarization-based optical isolator 506.

The reflections 513a, 513b may be circularly polarized when incident on the polarization-based optical isolator 506, with a handedness that is opposite to the handedness of the beams 510a, 510b in the same portion of the light source 501. After interacting with the polarization-based optical isolator 506, the polarization state of the beams 513a, 513b becomes linear, with most of the light being in a linear polarization state that is orthogonal to the polarization state of the beams 510a, 510b when the beams 510a, 510b are incident on the polarization-based optical isolator 506. The polarization-based optical isolator 506 is intended to reject (for example, remove from the path 512) light having an polarization state that is orthogonal to the polarization state of the beams 510a, 510b. However, because not all of the light in the beams 513a, 513b is in a polarization state that is orthogonal to the polarization state of the beams 510a, 510b, some of the light in the beams 513a, 513b is not rejected by the polarization-based optical isolator 506 and remains on the path 512. This leakage light (the portion of the beams 513a, 513b that passes through the polarization-dependent optical isolator 506) may have the same polarization state that the beams 510a, 510b have when they are propagating in the opposite direction in the same portion of the light source 501. However, when the leakage light is incident on the diffractive optical element 532 it is diverged (even if the beams 510a, 510b are not diverged by the diffractive optical element 532) because the diffractive optical element 532 is able to change the propagation of incident light based on the polarization state of the light and the direction of propagation of the light. Because the beams 513a, 513b propagate in a different direction than the beams 510a, 510b, the diffractive optical element 532 is able to cause the beams 513a, 513b to diverge while maintaining the proper propagation of the beams 510a, 510b even if the beams 513a, 513b have the same polarization state as the beams 510a, 510b.

In this way, the optical isolation system 530 and the optical isolator 506 operated based on different principles and may provide enhanced performance and greater reduction of the optical power of the beams 513*a*, 513*b* when used together. For example, even if a relatively small amount of the beam 513*a* and/or 513*b* (for example, 10-30 Watts) leaks through the isolator 506, without the system 530, all of this leakage light would be amplified by the pre-amplifier 507, and a large amount of light (for example, 1-900 Watts) could reach the light-generation-modules 504*a*, 504*b*, potentially causing instability, reduced amplification of the beams 510*a*, 510*b*, and/or other issues.

In the example shown in FIGS. 5A and 5B, the polarization-dependent optical isolation system 530 is between the pre-amplifier 507 and the polarization-based optical isolator 506. The light beams 510*a*, 510*b* are converged or collimated by the polarization-dependent optical isolation system 530. As discussed with respect to FIGS. 2C and 2D, even though the reflection 513*a*, 513*b* may have the same polarization state as the respective light beam 510*a*, 510*b*, because the reflection 513*a*, 513*b* propagates through the polarization-dependent optical isolation system 530 in a different direction than the respective light beam 510*a*, 510*b*, the polarization-dependent optical isolation system 530 changes the propagation of the light beams 510*a*, 510*b* in a different manner than the reflections 513*a*, 513*b*. For example, the reflections 513*a*, 513*b* may be diverged such that the amount of light from either of the reflections 513*a*, 513*b* that reaches the pre-amplifier 507 is reduced.

Figure 6:
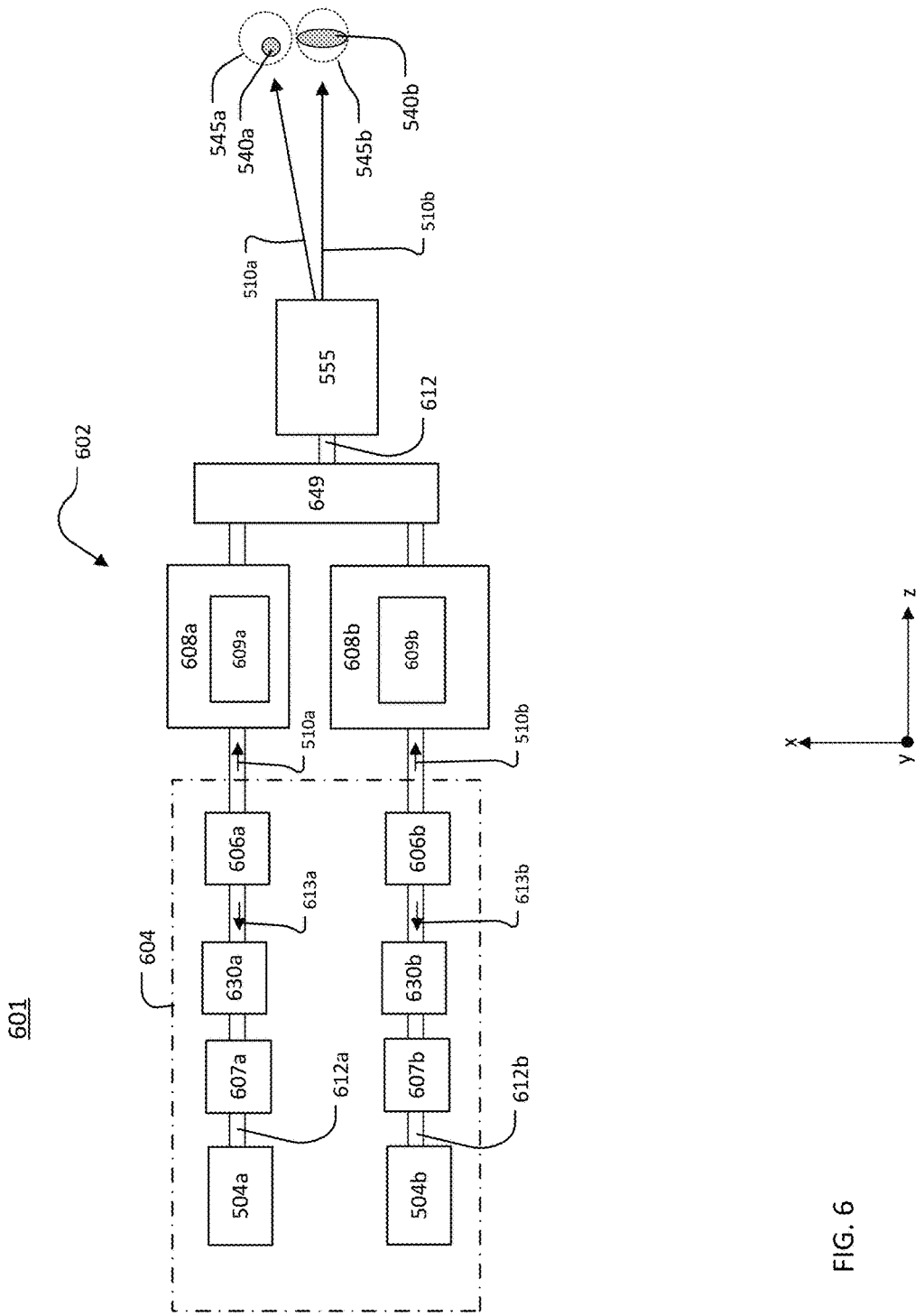

Referring to FIG. 6, a block diagram of another exemplary EUV light source 601 is shown. The EUV light source 601 may be used as the optical source 101 (FIG. 1). The EUV light source 601 includes an optical drive system 602, which generates the first and second light beams 510*a*, 510*b*. The optical drive system 602 includes a light-generation system 604, which is similar to the light-generation system 504 (FIG. 5A), except the light-generation system 604 has separate paths 612*a* and 612*b* along which the light beams 510*a*, 510*b* propagate.

In the example of FIG. 6, the first light-emitting module 504*a* and the second light-emitting module 504*b* are separate optical sources. The first light-emitting module 504*a* may be, for example, a solid-state laser, and the second light-generation emitting 504*b* may be a $CO_2$ laser. In implementations in which the first light-emitting module 504*a* is a solid state laser, the wavelength of the first light beam 510*a* may be, for example, 1.06 µm. The light beams 510*a*, 510*b* may have different intensities.

The first light-emitting module 504*a* emits the first light beam 510*a* onto the path 612*a*, and the second light-emitting module 504*b* emits the second light beam 510*b* onto the path 612*b*. The light beams 510*a*, 510*b* are amplified in separate amplifier chains. In the example shown in FIG. 6, the first light beam 510*a* is amplified by an amplifier 608*a*, which includes a gain medium 609*a*. The second light beam 510*b* is amplified by an amplifier 608*b*, which includes a gain medium 609*a*. The amplifiers 608*a*, 608*b* are separate amplifiers, though they may have the same properties. Thus, in the optical drive system 602, the first light beam 510*a* and the second light beam 510*b* are amplified separately from each other and in different paths. In the example of FIG. 6, the first light beam 510*a* and the second light beam 510*b* are amplified by respective pre-amplifiers 607*a*, 607*b* prior to being amplified by the respective amplifiers 608*a*, 608*b*.

The optical drive system 602 also includes a beam combiner 649. The beam combiner 649 receives the first light beam 510*a* and the second light beam 510*b* and directs the beams 510*a*, 510*b* onto the beam path 612 and toward the beam steering and focusing system 555. The beam combiner 649 may be any optical element or a collection of optical elements capable of interacting with the first light beam 510*a* and/or the second light beam 510*b* to direct the first and second light beams 510*a*, 510*b* onto the beam path 612.

The optical drive system 602 also includes polarization-dependent optical isolation systems 630*a* and 630*b*. The polarization-dependent optical isolation system 630*a* is on the path 612*a*, and the polarization-dependent optical isolation system 630*b* is on the path 612*b*. The polarization-dependent optical isolation systems 630*a*, 630*b* may be similar to the polarization-dependent optical isolation systems 130, 230. As discussed above, the wavelengths of the light beams 510*a*, 510*b* may be different. Thus, each of the polarization-dependent optical isolation systems 630*a*, 630*b* may be configured to perform optimally at the wavelength of the respective light beam 510*a*, 510*b*.

Figure 7:
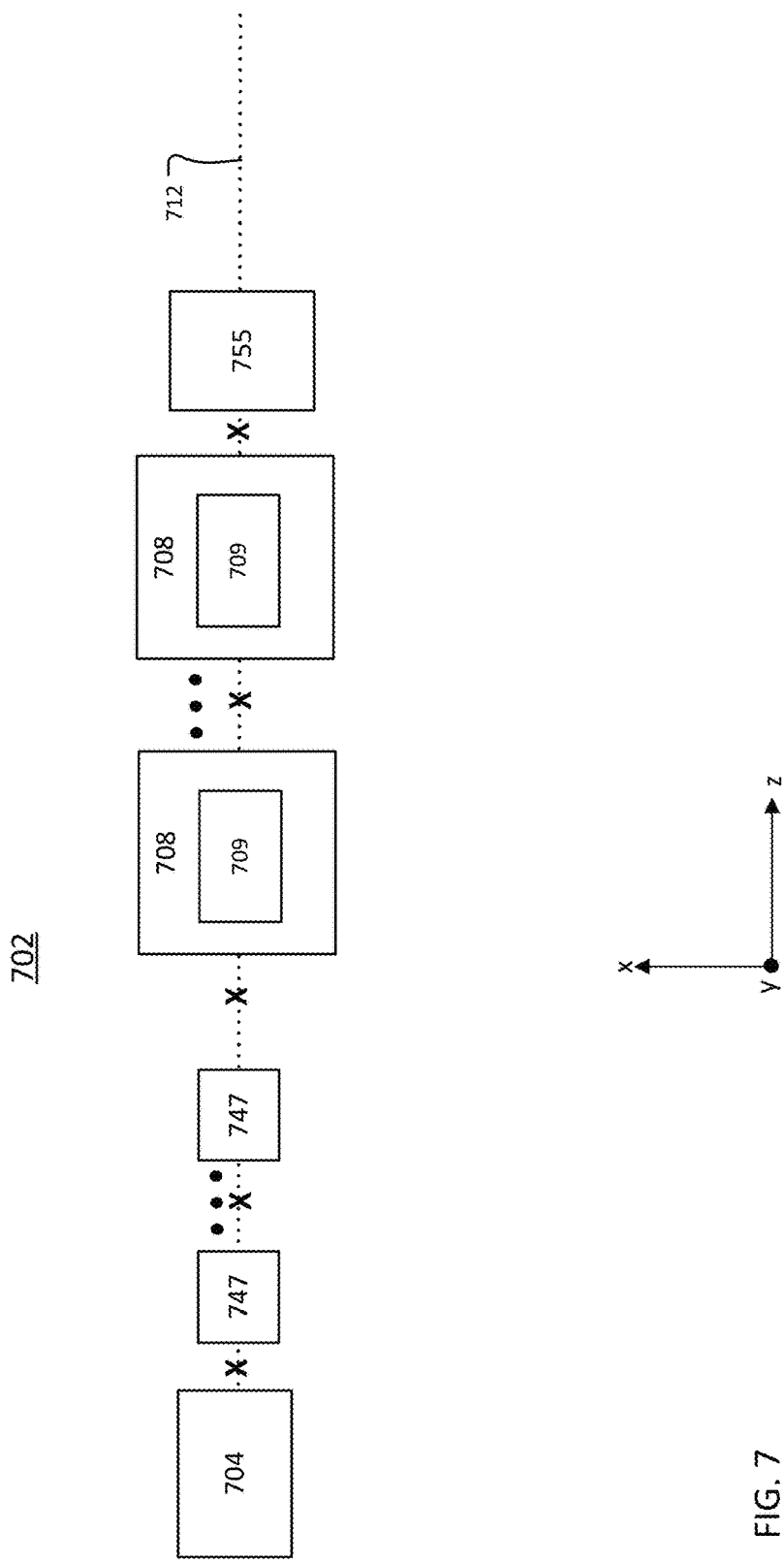
FIG. 7 is a block diagram of an exemplary EUV optical drive system.

Referring to FIG. 7, an exemplary optical drive system 702 is shown. The optical drive system 702 includes one or more polarization-dependent optical isolation system (such as the systems 130, 230). The optical drive system 702 is used to illustrate the locations in the system 702 where a polarization-dependent optical isolation system (such as systems 130, 230) may be placed. The optical drive system includes a light-generating system 704, pre-amplifiers 747, amplifiers 708, and a beam steering and focusing system 755 arranged on a path 712.

A polarization-dependent optical isolation system may be placed in any location on the path 712 where a reflection (a light beam propagating on the path 712 toward the light-generating system 704) has a polarization state that is diverged by the diffractive optical element of the polarization-dependent optical isolation system (or has a polarization state that may be converted into a polarization state that is diverged by the diffractive optical element). In FIG. 7, "X" marks the possible locations of a polarization-dependent optical isolation system. More than one polarization-dependent optical isolation system may be used simultaneously in the optical drive system 702. Additionally, locations other than those marked with an "X" are possible. For example, the polarization-dependent optical isolation system may be implemented in place of or on an optical element in the beam steering and focusing system 755, as a window on one or more of the pre-amplifiers 747, and/or as a window on one or more of the amplifiers 708.

Figure 8A:
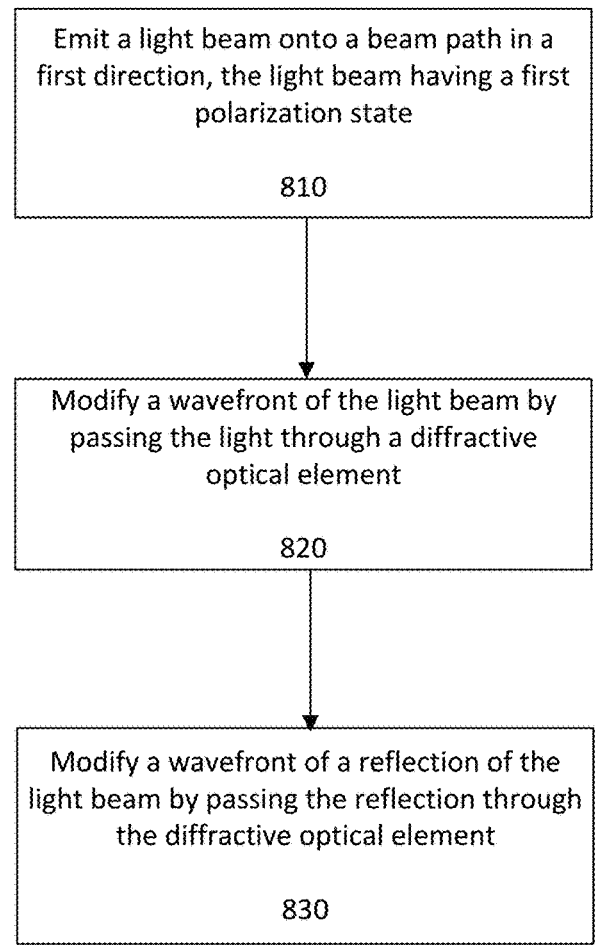
FIG. 8A is a flow chart of an exemplary process for reducing optical power of a reflection in an EUV light source.

Referring to FIG. 8A, a flow chart of an exemplary process 800 for reducing an amount of optical power in a reflected light beam is shown. The process 800 may be used in any of the EUV light sources discussed above, or in the EUV light source 900 (FIGS. 9A and 9B). The process 800 is discussed with respect to the light source 101 and FIG. 8B, which shows a portion of an exemplary optical drive system 802.

The light beam 110 is emitted onto the beam path 112 (810). The light beam 110 propagates in a first direction and has a first polarization state. For example, the light beam 110 propagates on the path 112 toward the target region 115. The light beam 110 may have a polarization state of, for example, right-hand circular, left-hand circular, linear (for example, s-polarized or p-polarized), left-hand elliptical, or right-hand elliptical. The polarization state of the light beam 110 may change as the light beam 110 propagates on the path 112 and interacts with optical elements on the path 112. In other words, the polarization state of the light beam 110 may vary along the path 112.

A wavefront of the light beam 110 is modified by passing the light beam 110 through a diffractive optical element in the polarization-dependent optical isolation system 130 (820). For example, the system 130 may modify the wavefront of the light beam 110 such that the light beam 110 is converged toward a first focal point. The light beam 110 passes through the polarization-dependent optical isolation system 130 in the z direction (toward the target region 115). Referring also to FIG. 2A, the light beam 110 may pass through a diffractive optical element such as the diffractive optical element 232. The diffractive optical element 232 is configured to converge light having the polarization state of the light beam 110 to the focal point 235A. The diffractive optical element 232 has different focal lengths for light that has a different polarization state and propagates through the diffractive optical element 232 in the z direction (the same direction as the light beam 110). For example, and referring to FIG. 2B, light that has a different polarization state than the light beam 110 but propagates in the z direction is focused based on the focal length 234B, which causes the light to diverge instead of converge.

A wavefront of the reflection 113 is modified by passing the reflection 113 through the diffractive optical element 232 (830). The wavefront of the reflection 113 is modified in a different manner than the wavefront of the light beam 110. For example, the wavefront of the reflection 113 may be modified such that the reflection 113 diverges. The reflection 113 of the light beam 110 propagates on the beam path 112 in a direction other than the direction in which the light beam 110 propagates. In the example of FIG. 1, the reflection 113 propagates in the −z direction (the direction that is opposite to the direction in which the light beam 110 propagates). The reflection 113 reaches the polarization-dependent optical isolation system 130 and passes through the diffractive optical element 232 in the −z direction. The reflection 113 may have the same polarization state at the diffractive optical element 232 as the light beam 110 had at the diffractive optical element 232, but the reflection 113 passes through the diffractive optical element 232 in the opposite direction. In some implementations, the focusing properties of the diffractive optical element 232 may depend on the direction in which an incident light beam passes through the diffractive optical element 232.

Thus, even though the reflection 113 has the same polarization state as the light beam 110 at the diffractive optical element 232, because the reflection 113 and the light beam 110 pass through the diffractive optical element 232 in different directions, the diffractive optical element 232 changes the propagation of the reflection 113 in a different manner than the light beam 110. For example, similar to the illustration shown in FIG. 2D, the reflection 113 may diverge after passing through the diffractive optical element 232. By diverging the reflection, the optical power of the reflection is spread over a larger area, thus, the power of the portion of the reflection 113 that remains on the beam path 112 is reduced.

Figure 8B:
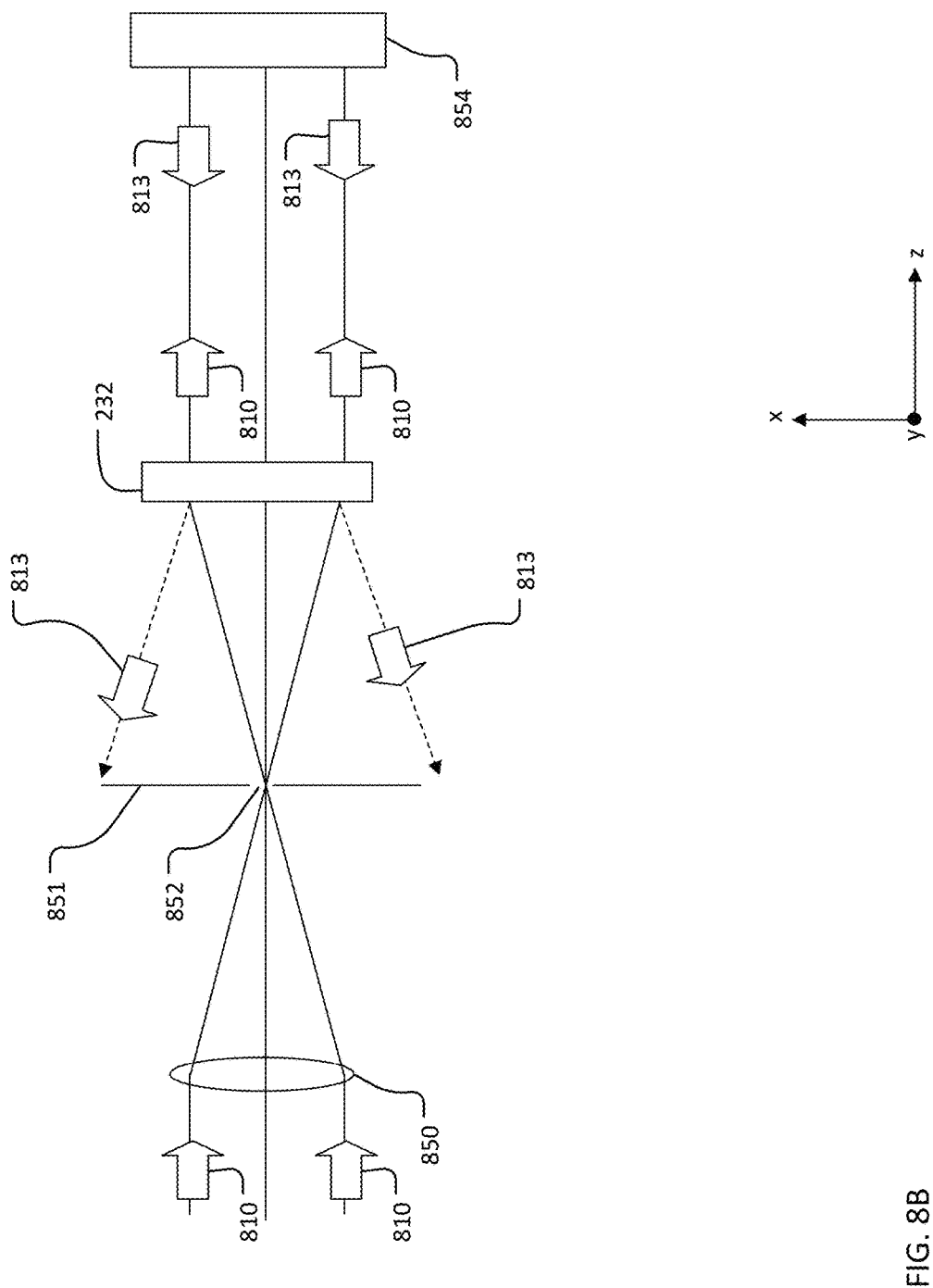
FIG. 8B is a block diagram of a portion of an exemplary EUV optical drive system.

Referring also to FIG. 8B, an example of reducing the optical power of a reflected light beam 813 is shown. FIG. 8B shows a section of an optical drive system 802. The section of the optical drive system 802 may be used in any of the optical drive systems discussed above. Additionally, the section of the optical drive system shown in FIG. 8B may be any portion of a complete optical drive system. For example, the section of the optical drive system 802 may be part of a light-generation system, such as the light generation system 504 (FIG. 5A).

In the optical drive system 802, a light beam 810 propagates toward a reflective element 854. The reflective element 854 may be, for example, a target material droplet, an optical element, such as a lens or mirror, a holder or post, or a spatial filter. The light beam 810 has a first polarization state. The light beam 810 propagates through a lens and is focused such that the light beam 810 passes through an aperture 852 of a spatial filter 851. The light beam 810 passes through the diffractive optical element 232 and is focused based on the focal length that the optical element 232 has for the first polarization state. In this example, the light beam 810 is collimated by the diffractive optical element 232.

All or a portion of the light beam 810 reflects off of the reflective element 854, producing the reflection 813. The reflection 813 passes through the diffractive optical element in the opposite direction as compared to the light beam 810. Although the reflection 813 may have the same polarization state as the light beam 810, the diffractive optical element 232 focuses the reflection 813 in a different manner than the light beam 810. In this example, the diffractive optical element diverges the reflection 813. The diverged reflection propagates away from the diffractive optical element 232 and, at the spatial filter, the diverged reflection has a diameter in the x-y plane that is greater than the width of the aperture 852. Thus, only a small portion of the reflected beam 813 reaches the lens 850. In this way, the diffractive optical element reduces the optical power of the reflected beam.

In the examples discussed above, the diffractive optical element 232 converges a forward-going beam (such as the light beam 110 of FIG. 1) and diverges a reflection of that beam (such as the reflected beam 113). However, the diffractive optical element 232 may be configured to change the propagation of incident light in another manner. For example, the diffractive optical element may be used to diverge the forward-going beam 110 and to converge the reflection 113. In these implementations, other optical elements may be used with the diffractive optical element 232 to reduce the optical power of the reflected light beam. For example, a lens or a mirror used with the diffractive optical element could be positioned to cause a reflected beam converged by the diffractive optical element to diverge.

Figure 9A:
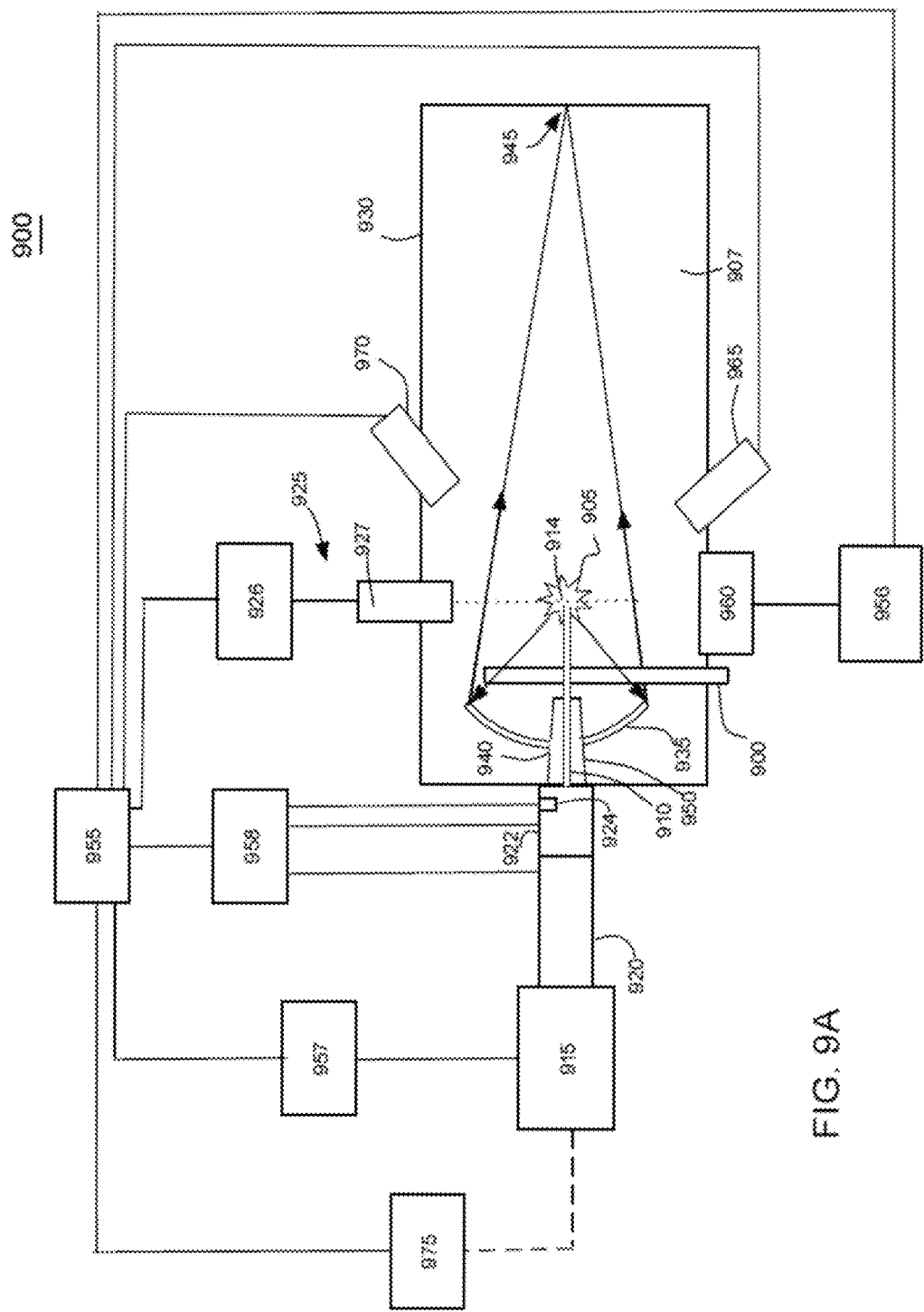
FIGS. 9A and 9B are block diagrams of an exemplary EUV light source.

Referring to FIG. 9A, an LPP EUV light source 900 is shown. The optical drive systems 102, 502, 602, and 702 may be part of an EUV light source, such as the source 900. The LPP EUV light source 900 is formed by irradiating a target mixture 914 at a target location 905 with an amplified light beam 910 that travels along a beam path toward the target mixture 914. The target material of the targets 118, 540a, and 540b may be or include the target mixture 914. The target location 905, which is also referred to as the irradiation site, is within an interior 907 of a vacuum chamber 930. When the amplified light beam 910 strikes the target mixture 914, a target material within the target mixture 914 is converted into a plasma state that has an element with an emission line in the EUV range. The created plasma has certain characteristics that depend on the composition of the target material within the target mixture 914. These characteristics may include the wavelength of the EUV light produced by the plasma and the type and amount of debris released from the plasma.

The light source 900 also includes a target material delivery system 925 that delivers, controls, and directs the target mixture 914 in the form of liquid droplets, a liquid stream, solid particles or clusters, solid particles contained within liquid droplets or solid particles contained within a liquid stream. The target mixture 914 includes the target material such as, for example, water, tin, lithium, xenon, or any material that, when converted to a plasma state, has an emission line in the EUV range. For example, the element tin may be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. The target mixture 914 may also include impurities such as non-target particles. Thus, in the situation in which there are no impurities, the target mixture 914 is made up of only the target material. The target mixture 914 is delivered by the target material delivery system 925 into the interior 907 of the chamber 930 and to the target location 905.

The light source 900 includes a drive laser system 915 that produces the amplified light beam 910 due to a population inversion within the gain medium or mediums of the laser system 915. The light source 900 includes a beam delivery system between the laser system 915 and the target location 905, the beam delivery system including a beam transport system 920 and a focus assembly 922. The beam transport system 920 receives the amplified light beam 910 from the laser system 915, and steers and modifies the amplified light beam 910 as needed and outputs the amplified light beam 910 to the focus assembly 922. The focus assembly 922 receives the amplified light beam 910 and focuses the beam 910 to the target location 905.

In some implementations, the laser system 915 may include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 915 produces an amplified light beam 910 due to the population inversion in the gain media of the laser amplifiers even if there is no laser cavity. Moreover, the laser system 915 may produce an amplified light beam 910 that is a coherent laser beam if there is a laser cavity to provide enough feedback to the laser system 915. The term "amplified light beam" encompasses one or more of: light from the laser system 915 that is merely amplified but not necessarily a coherent laser oscillation and light from the laser system 915 that is amplified and is also a coherent laser oscillation.

The optical amplifiers in the laser system 915 may include as a gain medium a filling gas that includes $CO_2$ and may amplify light at a wavelength of between about 9100 and about 11000 nm, and in particular, at about 10600 nm, at a gain greater than or equal to 800. Suitable amplifiers and lasers for use in the laser system 915 may include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 40 kHz or more. The optical amplifiers in the laser system 915 may also include a cooling system such as water that may be used when operating the laser system 915 at higher powers.

Figure 9B:
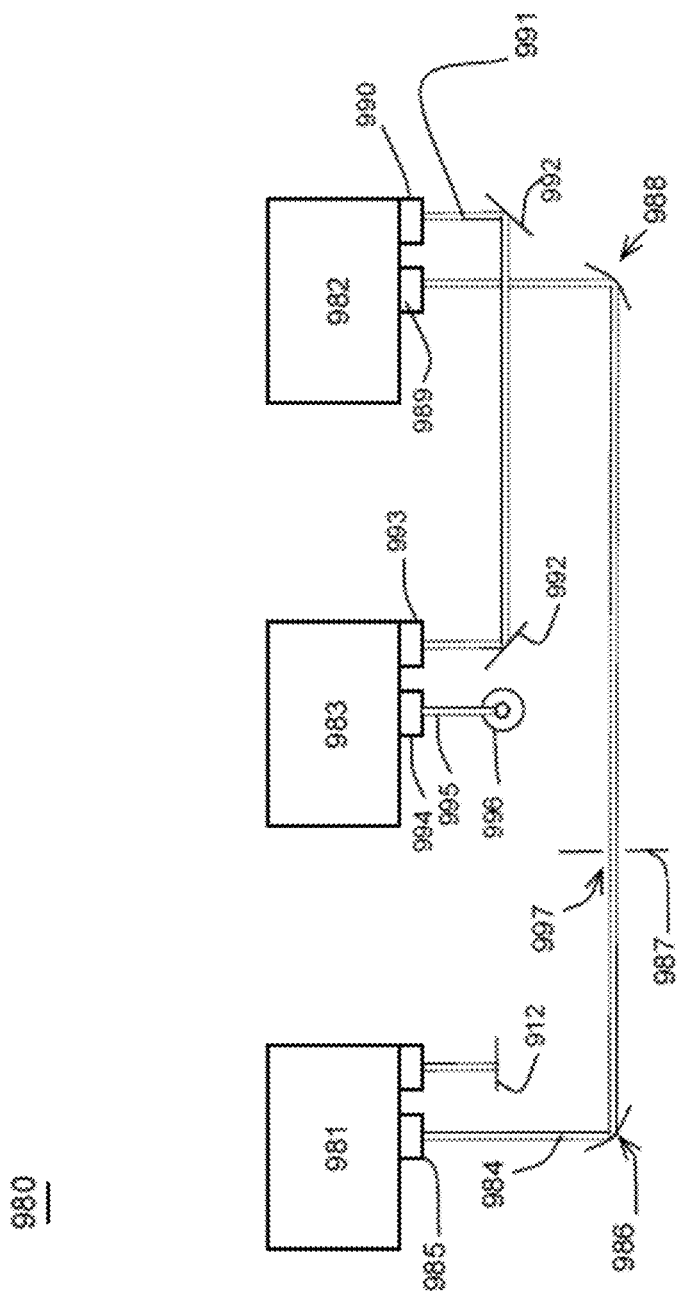

FIG. 9B shows a block diagram of an exemplary drive laser system 980. The drive laser system 980 may be used as part of the drive laser system 915 in the source 900. The drive laser system 980 includes three power amplifiers 981, 982, and 983. Any or all of the power amplifiers 981, 982, and 983 may include internal optical elements (not shown).

Light 984 exits the power amplifier 981 through an output window 985 and is reflected off a curved mirror 986. After reflection, the light 984 passes through a spatial filter 987, is reflected off of a curved mirror 988, and enters the power amplifier 982 through an input window 989. The light 984 is amplified in the power amplifier 982 and redirected out of the power amplifier 982 through an output window 990 as light 991. The light 991 is directed toward the amplifier 983 with a fold mirror 992 and enters the amplifier 983 through an input window 993. The amplifier 983 amplifies the light 991 and directs the light 991 out of the amplifier 983 through an output window 994 as an output beam 995. A fold mirror 996 directs the output beam 995 upward (out of the page) and toward the beam transport system 920 (FIG. 9A).

Any of the windows 985, 989, 990, 993, 994 may be implemented as a polarization-dependent optical isolation system such as the systems 130, 230, 530 discussed above.

Referring again to FIG. 9B, the spatial filter 987 defines an aperture 997, which may be, for example, a circle having a diameter between about 2.2 mm and 3 mm. The curved mirrors 986 and 988 may be, for example, off-axis parabola mirrors with focal lengths of about 1.7 m and 2.3 m, respectively. The spatial filter 987 may be positioned such that the aperture 997 coincides with a focal point of the drive laser system 980.

Referring again to FIG. 9A, the light source 900 includes a collector mirror 935 having an aperture 940 to allow the amplified light beam 910 to pass through and reach the target location 905. The collector mirror 935 may be, for example, an ellipsoidal mirror that has a primary focus at the target location 905 and a secondary focus at an intermediate location 945 (also called an intermediate focus) where the EUV light may be output from the light source 900 and may be input to, for example, an integrated circuit lithography tool (not shown). The light source 900 may also include an open-ended, hollow conical shroud 950 (for example, a gas cone) that tapers toward the target location 905 from the collector mirror 935 to reduce the amount of plasma-generated debris that enters the focus assembly 922 and/or the beam transport system 920 while allowing the amplified light beam 910 to reach the target location 905. For this purpose, a gas flow may be provided in the shroud that is directed toward the target location 905.

The light source 900 may also include a master controller 955 that is connected to a droplet position detection feedback system 956, a laser control system 957, and a beam control system 958. The light source 900 may include one or more target or droplet imagers 960 that provide an output indicative of the position of a droplet, for example, relative to the target location 905 and provide this output to the droplet position detection feedback system 956, which may, for example, compute a droplet position and trajectory from which a droplet position error may be computed either on a droplet by droplet basis or on average. The droplet position detection feedback system 956 thus provides the droplet position error as an input to the master controller 955. The master controller 955 may therefore provide a laser position, direction, and timing correction signal, for example, to the laser control system 957 that may be used, for example, to control the laser timing circuit and/or to the beam control system 958 to control an amplified light beam position and shaping of the beam transport system 920 to change the location and/or focal power of the beam focal spot within the chamber 930.

The target material delivery system 925 includes a target material delivery control system 926 that is operable, in response to a signal from the master controller 955, for example, to modify the release point of the droplets as released by a target material supply apparatus 927 to correct for errors in the droplets arriving at the desired target location 905.

Additionally, the light source 900 may include light source detectors 965 and 970 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 965 generates a feedback signal for use by the master controller 955. The feedback signal may be, for example, indicative of the errors in parameters such as the timing and focus of the laser pulses to properly intercept the droplets in the right place and time for effective and efficient EUV light production.

The light source 900 may also include a guide laser 975 that may be used to align various sections of the light source 900 or to assist in steering the amplified light beam 910 to the target location 905. In connection with the guide laser 975, the light source 900 includes a metrology system 924 that is placed within the focus assembly 922 to sample a portion of light from the guide laser 975 and the amplified light beam 910. In other implementations, the metrology system 924 is placed within the beam transport system 920. The metrology system 924 may include an optical element that samples or re-directs a subset of the light, such optical element being made out of any material that may withstand the powers of the guide laser beam and the amplified light beam 910. A beam analysis system is formed from the metrology system 924 and the master controller 955 since the master controller 955 analyzes the sampled light from the guide laser 975 and uses this information to adjust components within the focus assembly 922 through the beam control system 958.

Thus, in summary, the light source 900 produces an amplified light beam 910 that is directed along the beam path to irradiate the target mixture 914 at the target location 905 to convert the target material within the mixture 914 into plasma that emits light in the EUV range. The amplified light beam 910 operates at a particular wavelength (that is also referred to as a drive laser wavelength) that is determined based on the design and properties of the laser system 915. Additionally, the amplified light beam 910 may be a laser beam when the target material provides enough feedback back into the laser system 915 to produce coherent laser light or if the drive laser system 915 includes suitable optical feedback to form a laser cavity.

Other implementations are within the scope of the claims. The beam paths 112, 512, 612a, 612b, 612, and 712 are illustrated as being substantially straight along the z dimension. However, any of these paths may have more complex spatial arrangements that are not necessarily along a single dimension. The polarization-dependent optical isolation system 530B (FIG. 5B) is provided as an example, and other implementations are possible.

What is claimed is:

1. A system for an extreme ultraviolet (EUV) light source, the system comprising:
    a light-generation system configured to emit one or more light beams onto a beam path;
    one or more optical amplifiers, each of the one or more amplifiers comprising a gain medium on the beam path, each gain medium being configured to amplify the one or more light beams to produce one or more amplified light beams; and
    a diffractive optical element on the beam path, wherein the diffractive optical element is configured to cause a plurality of wavefront modifications to an incident light beam, and each of the wavefront modifications is associated with a particular polarization state of the incident light beam, and the plurality of wavefront modifications comprises at least one wavefront modification configured to cause the incident light beam to diverge, and at least one wavefront modification configured to cause the incident light beam to converge, wherein
    the diffractive optical element comprises a substrate and a structure, the structure comprising a plurality of physical features, and
    the physical features are separated from each other by a distance that is smaller than a wavelength of the incident light beam.

2. The system of claim 1, wherein each of the wavefront modifications is further associated with a direction of propagation of the incident light beam.

3. The system of claim 1, wherein the incident light beam has a propagation direction, and the plurality of wavefront modifications includes at least one wavefront modification configured to change the propagation direction of the incident light beam.

4. The system of claim 2, wherein the plurality of wavefront modifications comprise at least a first wavefront modification and a second wavefront modification, the first wavefront modification is associated with a first polarization state and a first propagation direction, the second wavefront modification is associated with the first polarization state and a second propagation direction, the first wavefront modification is configured to change the propagation direction of the incident light beam such that the incident light beam propagates away from the diffractive optical element at a first angle, the second wavefront modification is configured to change the propagation direction of the incident light beam such that the incident light beam propagates away from the diffractive optical element at a second angle, the first and second angles being different angles.

5. The system of claim 1, wherein the physical features comprise a plurality of grooves.

6. An extreme ultraviolet (EUV) light source comprising:
    a target material supply apparatus configured to provide a target to a target region, the target comprising a target material that emits EUV light when in a plasma state;
    a vacuum chamber configured to receive the target at the target region; and
    a diffractive optical element configured for placement on a beam path between a light-generation system and the target region, wherein
    the diffractive optical element is configured to interact with an incident light beam and to modify a property of the incident light beam based on the interaction, the modification depending on a direction of propagation of the incident light beam and a polarization state of the incident light beam, and the diffractive optical element being configured to modify a property of the incident light beam comprises the diffractive optical element being configured to change the direction of propagation of the incident light beam, wherein
    the diffractive optical element comprises a substrate and a structure, the structure comprising a plurality of physical features, and
    the physical features are separated from each other by a distance that is smaller than a wavelength of the incident light beam.

7. The EUV light source of claim 6, wherein the diffractive optical element is configured to change the direction of the incident light beam such that an incident light beam having a first polarization state and a first propagation direction propagates at a first angle relative to the diffractive optical element after interacting with the diffractive optical element, and an incident light beam having a second polarization state and the first propagation direction propagates at a second angle relative to the diffractive optical element after interacting with the diffractive optical element, the first and second polarization states are different, and the first and second angles are different.

8. The EUV light source of claim 6, wherein the diffractive optical element is configured to change the direction of the incident light beam such that an incident light beam having a first polarization state and a first propagation direction propagates at a first angle relative to the diffractive optical element after interacting with the diffractive optical element, and an incident light beam having the first polarization state and a second propagation direction propagates at a second angle relative to the diffractive optical element after interacting with the diffractive optical element, the first and second propagation directions are different, and the first and second angles are different.

9. The EUV light source of claim 6, wherein the physical features comprise a plurality of grooves.

10. The EUV light source of claim 6, further comprising a second light source and a second diffractive optical element, the second diffractive optical element being configured for placement between the second light source and the target region, wherein the second diffractive optical element is configured to interact with an incident light beam and to modify a property of the incident light beam based on the interaction, the modification depending on a direction of propagation of the incident light beam and a polarization state of the incident light beam.

11. A method comprising:
emitting a forward-going light beam onto a beam path, the forward-going light beam having a first polarization state and propagating on the beam path in a first direction;
modifying a wavefront of the forward-going light beam by interacting the light beam with a diffractive optical element, wherein the diffractive optical element is configured to cause a plurality of wavefront modifications to an incident light beam, and each of the wavefront modifications is associated with a polarization state of the incident light beam;
interacting the forward-going light beam with an optically reflective element to produce a reflection of the forward-going light beam; and
modifying a wavefront of the reflection of the forward-going light beam by interacting the reflection with the diffractive optical element, the diffractive optical element modifying the wavefront of the incident light beam and the wavefront of the reflection differently.

12. The method of claim 11, wherein the diffractive optical element is configured to modify the wavefront of the reflection such that the reflection diverges and propagates away from the beam path.

13. The method of claim 11, wherein interacting the forward-going light beam with an optically reflective element comprises interacting the forward- going light beam with a target comprising a target material that emits EUV light when in a plasma state.

* * * * *